(12) United States Patent
Becker

(10) Patent No.: US 9,771,991 B2
(45) Date of Patent: Sep. 26, 2017

(54) BRAKE LINING ASSEMBLY FOR A DISK BRAKE COMPRISING A NOISE-REDUCING DEVICE

(71) Applicant: Lucas Automotive GmbH, Koblenz (DE)

(72) Inventor: Marco Becker, Oberdürenbach (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/901,269

(22) PCT Filed: Jun. 23, 2014

(86) PCT No.: PCT/EP2014/063100
§ 371 (c)(1),
(2) Date: Dec. 28, 2015

(87) PCT Pub. No.: WO2014/206906
PCT Pub. Date: Dec. 31, 2014

(65) Prior Publication Data
US 2016/0131209 A1    May 12, 2016

(30) Foreign Application Priority Data

Jun. 28, 2013 (DE) .......... 10 2013 010 876

(51) Int. Cl.
*F16D 65/14* (2006.01)
*F16D 65/097* (2006.01)
(Continued)

(52) U.S. Cl.
CPC ......... *F16D 65/097* (2013.01); *F16D 55/226* (2013.01); *F16D 65/092* (2013.01);
(Continued)

(58) Field of Classification Search
CPC .. F16D 65/092; F16D 65/097; F16D 65/0006; F16D 55/226; F16D 65/0977; F16D 65/0978
(Continued)

(56) References Cited

U.S. PATENT DOCUMENTS 3,616,878 A    11/1971    Girauldon
3,638,765 A    2/1972    Flaherty et al.
(Continued)

FOREIGN PATENT DOCUMENTS

DE    3333670 A1    4/1985
DE    3803069 A1    3/1989
(Continued)

OTHER PUBLICATIONS

German Search Report, Application No. DE 102013010876.4, dated Jan. 24, 2014.
(Continued)

*Primary Examiner* — Pamela Rodriguez
(74) *Attorney, Agent, or Firm* — MacMillan, Sobanski & Todd, LLC

(57) ABSTRACT

A brake lining arrangement for a vehicle brake with a friction lining and a lining backing plate, having a receiving portion arranged in its lateral edge region for receiving a separate damping element, which laterally grasps the lining backing plate, wherein the damping element has a contact portion for contacting a portion of a brake caliper corresponding with the contact portion, and the damping element is adapted to be deformable or/and displaceable at least in sections upon a contacting.

15 Claims, 3 Drawing Sheets

(51) Int. Cl.
*F16D 55/226* (2006.01)
*F16D 65/092* (2006.01)

(52) U.S. Cl.
CPC ..... *F16D 65/0972* (2013.01); *F16D 65/0977* (2013.01); *F16D 65/0978* (2013.01)

(58) Field of Classification Search
USPC ............ 188/205 A, 205 R, 206 R, 217, 259, 188/250 D, 250 E
See application file for complete search history.

(56) References Cited

U.S. PATENT DOCUMENTS

| | | | |
|---|---|---|---|
| 6,170,618 B1 | 1/2001 | Rueckert | |
| 2011/0180359 A1* | 7/2011 | Latifi | F16D 65/0006 188/234 |
| 2014/0047690 A1* | 2/2014 | Plantan | F16D 65/092 29/407.09 |
| 2014/0291082 A1 | 10/2014 | Mallmann et al. | |

FOREIGN PATENT DOCUMENTS

| | | |
|---|---|---|
| DE | 102006052178 A1 | 6/2007 |
| DE | 602004009485 T2 | 8/2008 |
| DE | 102011112247 A1 | 3/2013 |
| DE | 102012011233 A1 | 12/2013 |
| EP | 0609245 B1 | 9/1992 |
| EP | 1447585 A2 | 8/2004 |
| FR | 2038663 A6 | 12/1970 |
| GB | 2109065 A | 5/1983 |
| JP | 2007024219 A | 2/2007 |
| JP | 2009156334 A | 7/2009 |

OTHER PUBLICATIONS

PCT International Search Report, Application No. PCT/EP2014/063100, dated Dec. 18, 2014.
PCT International Preliminary Report on Patentability, Application No. PCT/EP2014/063100, dated Sep. 28, 2015.

* cited by examiner

BRAKE LINING ASSEMBLY FOR A DISK BRAKE COMPRISING A NOISE-REDUCING DEVICE

CROSS-REFERENCE TO RELATED APPLICATIONS

This application is a national stage of International Application No. PCT/EP2014/063100, filed Jun. 23, 2014, the disclosures of which are incorporated herein by reference in entirety, and which claimed priority to German Patent Application No. 10 2013 010 876.4, filed Jun. 28, 2013, the disclosures of which are incorporated herein by reference in entirety.

BACKGROUND OF THE INVENTION

The invention relates to a brake lining arrangement for a vehicle brake with a friction lining and a lining backing plate, having a receiving portion arranged in its lateral edge region for receiving a separate damping element, which laterally grasps the lining backing plate.

Such a brake lining arrangement is known, for example, from DE 10 2006 052 178 A1. In the case of the disc brake described therein, a brake caliper has an axially rotatable brake disc, at least one pair of brake linings being axially shiftably arranged in the brake caliper. Circumferential and radial forces arising from the braking are led off into the brake caliper via the brake linings, since the brake linings are mounted in the brake caliper in the circumferential direction via abutment surfaces and in the radial direction via supporting surfaces. In particular, braking forces acting on the brake linings in the circumferential or longitudinal direction are led into one of the holders associated with the disc brake via holder abutment surfaces formed on guide shafts. Further forces, for example torque and weight forces, which act in the radial direction of the brake disc, can be led into the holder via holder supporting surfaces. Between the supporting surfaces and the holder supporting surfaces is arranged a strap which serves to facilitate the axial shiftability of the brake lining in the guide shaft. In order to counteract noise development, this strap is rigidly connected to the backing plate.

In general, the outer dimensions of lining backing plates from the prior art of known brake lining arrangements in the longitudinal direction, i.e. in the circumferential direction of the brake disc, are less than the width of the guide, in which they are arranged on the brake caliper or brake carrier. As a result, the brake lining arrangement is always spaced from the brake carrier and thus has a functional play. When used in a vehicle, this causes a disturbing striking noise to arise, in particular when changing between forward travel and reverse travel while simultaneously braking. This striking noise arises when the brake lining arrangement strikes the brake carrier carrying the brake lining arrangement.

BRIEF SUMMARY OF THE INVENTION

Accordingly, a feature of the present invention is to provide a braking lining arrangement of the type described at the outset, in which a striking noise is effectively reduced or avoided, without the danger of the friction lining becoming jammed.

This feature is achieved by a brake lining arranged of the type described at the outset in which it is provided that the damping element has a contact portion for contacting a portion of a brake carrier corresponding with the contact portion, and the damping element is adapted to be deformable or/and displaceable at least in sections upon a contacting. Preferably, the deformation is elastic, but it may also be plastic. Particularly advantageously in this case is a combination of an elastic deformation of the damping element with a displacement or shifting of the damping element.

In an embodiment of the invention, the receiving portion comprises a first recess on a first longitudinal side of the lining backing plate. The recess in this case preferably has a flat region. Alternatively or additionally thereto, the recess can have an edge region, at least in sections sloping with respect to a centre plane of the lining backing plate, with a slope. The centre plane of the lining backing plate in this context runs substantially parallel to a surface of the lining backing plate, for example to a boundary surface between the lining backing plate and the friction lining.

According to the invention it is provided that the receiving portion of the lining backing plate further has a second recess which is arranged on the first longitudinal side of the lining backing plate in a manner spaced apart from the first recess. In particular, in this case the second recess can be arranged at a shorter distance from the centre of the lining backing plate than the first recess. This makes it possible, for example, to specify certain degrees of freedom for the movement of the damping element.

In an embodiment of the invention, the receiving portion of the lining backing plate further has a third and a fourth recess, the third and the fourth recess being arranged on a second longitudinal side of the lining backing plate opposite the first longitudinal side of the lining backing plate. In this case, the first recess can be formed like the third recess and the fourth recess can be formed like the second recess. Preferably, the first and the third recess and the second and the fourth recess are arranged on the backing plate respectively symmetrically to one another with respect to a centre plane of the lining backing plate. This ensures, for example, a simple production of the lining backing plate.

In a further embodiment of the invention, the damping element is of C- or U-shaped configuration and clasps the lining backing plate in such a manner that the two clamping limbs of the lining backing plate are arranged on mutually opposite sides of the lining backing plate. The two limbs of the damping element of C- or U-shaped configuration are in this case connected via the contact portion. Advantageously, the two limbs and the contact portion are of flat form. However, they may also be of rod-shaped form. In particular, the damping element can be configured symmetrically with respect to at least one of its centre planes. It is preferably configured symmetrically with respect to one of its centre planes.

In a development of the invention, the damping element has on each of the two clamping limbs a fixing projection. This fixing projection has at its distal end a predetermined material thickness, the fixing projections being adapted to be in engagement with the second and the fourth recess. In this case the length of the second and the fourth recess along a longitudinal direction of the lining backing plate can be respectively greater than the predetermined material thickness of the fixing projection. Thus with the aid of the fixing projection, the damping element is captively fastened to the lining backing plate and at the same time shiftable in a longitudinal direction of the lining backing plate.

According to the invention, it can further be provided that the damping element has, on one or alternatively on both of the clamping limbs, respectively at least one spring projection angled off with respect to the clamping limb. It is provided that the angle between the spring projection and the clamping limb is in each case flat. For example, this angle may lie between 5 and 15 degrees. Alternately, however, any other angle value less than 180 degrees is also conceivable. The clamping limbs can moreover each have a cutout which is adapted to receive the spring projections therein. In this case, the outer dimensions of the spring projections do not exceed the inner dimensions of the cutout, so that the spring projections fit into the cutout. One or more spring projections can, moreover, be elastically formed.

Preferably, the spring projections are adapted to slide along a slope in the sloping edge region of the first recesses. As a result, an impulse supplied to the lining backing plate is cushioned. During the sliding or the cushioning, the angle between the spring projections and the clamping limbs changes. In particular, it is reduced. In the case of elastic cushioning, the angle between the spring projections and the clamping limbs after the cushioning operation corresponds to the original angle again.

For simplified production of the invention, it is provided that the damping element is formed materially integrally. This is advantageous in particular when the damping element is of U-shaped and symmetrical configuration. For this purpose, the damping element can be formed as a stamped and bent part, for example, from one piece of sheet metal, for example a spring steel, of the specified material thickness.

Preferably, a lateral surface of the lining backing plate is spaced apart from a connecting portion, connecting the two clamping limbs of the U-shaped damping element, by at least 0.1 mm. This makes is possible to ensure a minimum degree of spring travel or damping travel for the damping element. In an alternative embodiment, the minimum spacing is predetermined in dependence on the weight or other structural parameters of the brake lining arrangement.

The invention further relates to a disc brake arrangement for a vehicle system with a brake disc and a brake lining arrangement of the type described above, the brake lining arrangement being arranged movably relative to the brake disc, in order to act on the brake disc by means of a friction lining. As already explained in detail above, in the case of this brake lining arrangement it is provided that the damping element has a contact portion for contacting a portion of a brake carrier corresponding with the contact portion, and the damping element is adapted to be deformable or/and displaceable at least in sections upon a contacting.

Other advantages of this invention will become apparent to those skilled in the art from the following detailed description of the preferred embodiments, when read in light of the accompanying drawings.

DETAILED DESCRIPTION OF THE INVENTION

Figure 1:
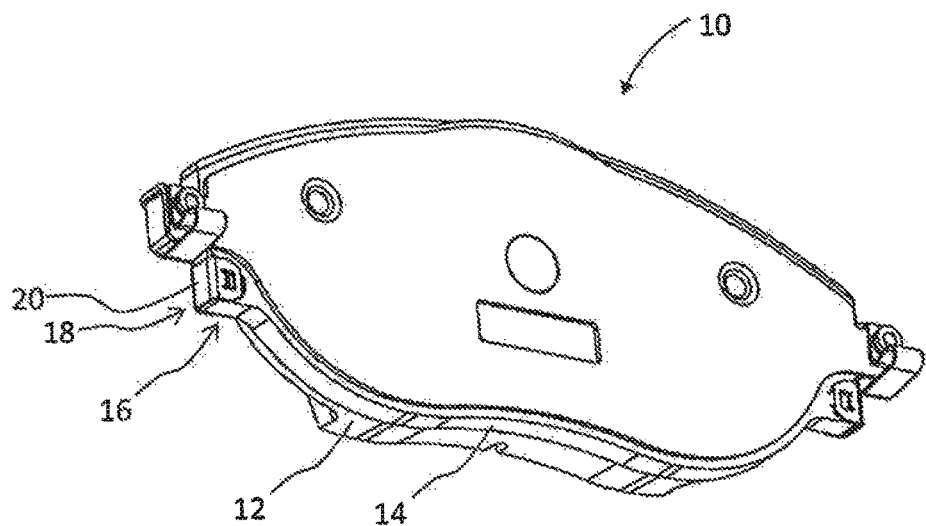
FIG. 1 shows a perspective general view of a brake lining arrangement according to the invention in a rear view.
Figure 2:
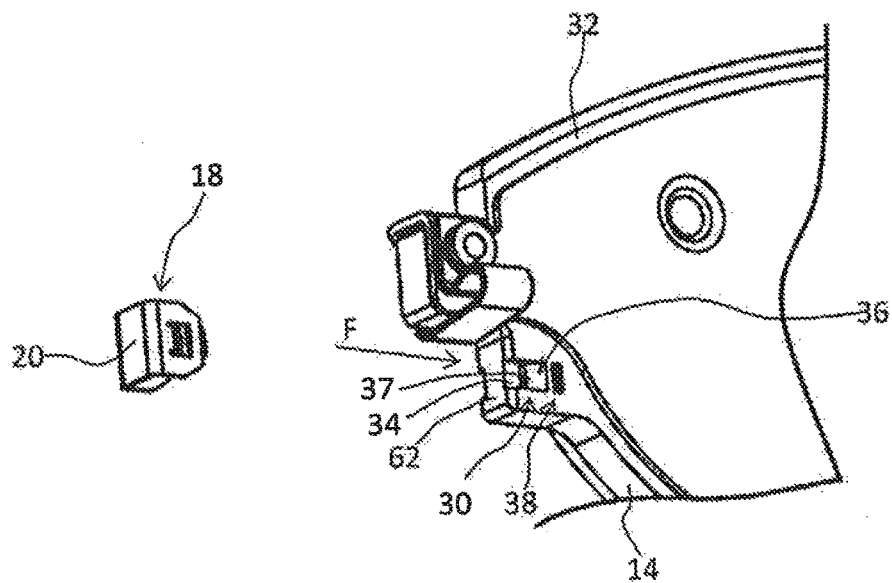
FIG. 2 shows a perspective detail view of the brake lining arrangement from FIG. 1, the damping element being shown separated from the lining backing plate.

In FIG. 1 a perspective general view of the brake lining arrangement 10 according to the present invention is shown. The brake lining arrangement 10 comprises a friction lining 12 and a lining backing plate 14, having a receiving portion 16 arranged in its lateral edge region for receiving a separate damping element 18, which laterally grasps the lining backing plate 14. The damping element 18 in this case has a contact portion 20 for contacting a portion 22 of a brake carrier 24 corresponding with the contact portion 20.

The friction lining 12 is adapted to be pressed against a brake disc upon an actuation of a brake comprising the brake lining arrangement and thereby exert a frictional force on a brake disc (not shown). Upon a change of rotational direction of the brake disc, the brake lining arrangement thus moves owing to the above-described inherently present functional play with respect to the brake carrier 24. Conventional brake lining arrangements are thereby in danger of striking the brake 24, whereby a clearly perceptible and unpleasant striking noise is produced.

Owing to the fact that the damping element 18 is deformable and displaceable in sections (here in particular with respect to the brake carrier 24 and the lining backing plate 14), it helps to avoid such striking noises. In the event of contact, i.e. from the time of the contacting, a force acts on the damping element along the direction F. Upon a contact, the damping element 18 is thus pushed (further) onto the receiving portion 16 laterally substantially along the direction F in the longitudinal direction of the lining backing plate 14. As a result, the damping element 18 can cushion or dampen upon the contacting or striking of the damping element 18 against the corresponding portion 22 of the brake carrier. As a rule, however, it is elastically deformed and in this case acts as a spring arranged between the lining backing plate and the brake carrier 24.

The receiving portion 16 has a first recess 30 on a first longitudinal side 32 of the lining backing plate 14, the first recess 30 having a flat region 34 and an edge region 36, sloping with respect to a centre plane A of the lining backing plate 14, with a first slope 37. The receiving portion 16 of the lining backing plate 14 further has a second recess 38, which is arranged on the first longitudinal side 32 of the lining backing plate 14 in a manner spaced apart from the first recess 30. The second recess 38 is arranged at a shorter distance from the centre of the lining backing plate than the first recess 30. In other words, the second recess 38 is arranged further away from the lateral edge of the receiving portion 16, facing a lateral surface 62 of the lining backing plate 14, than the first recess 30.

Figure 3:
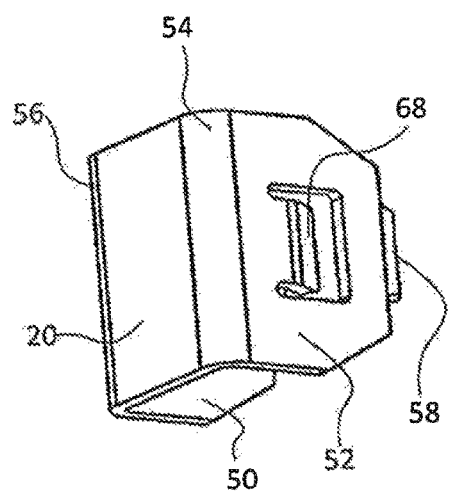
FIG. 3 shows a perspective detail view of the damping element according to the invention.
Figure 4:
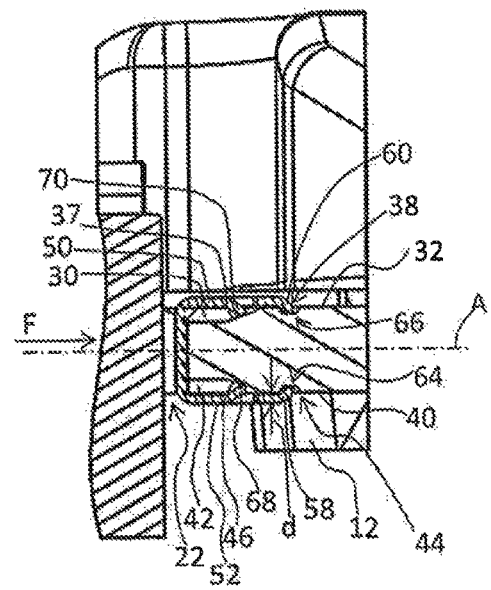
FIG. 4 shows a sectional view of a detail of the brake lining arrangement shown in FIG. 1 with engaged damping element.
Figure 5:
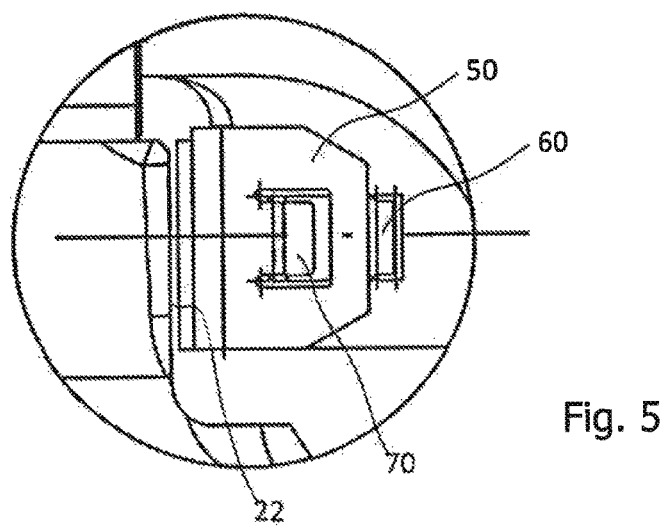
FIG. 5 shows a plan view of the detail of the brake lining arrangement shown in FIG. 4.

As shown in detail in FIGS. 3 to 5, the receiving portion 16 of the lining backing plate 14 furthermore has a third recess 42 and a fourth recess 44. The third and the fourth recess 42, 44 are arranged on a second longitudinal side 40 of the lining backing plate 14 opposite the first longitudinal side 32 of the lining backing plate 14 and configured mirror-inverted thereto, i.e. surface-symmetrical with respect to the centre plane A of the lining backing plate 14. In other words, the first and the third recess 30, 42 and the second and the fourth recess 38, 44 are arranged and configured respectively symmetrical to one another with respect to a centre plane A of the lining backing plate 14, the third recess 42 having a second slope 46. The first and the second slope 37, 46 are in this case oppositely formed or oriented with respect to the centre plane A of the lining backing plate 14. The friction lining 12 on the lining backing plate 14 is also arranged on the second longitudinal side 40.

The damping element 18 provided in this embodiment is of U-shaped configuration. It is produced from a metal sheet of a predetermined material thickness d (here for example a spring steel, approx. 0.6 mm thick). The U-shaped damping element 18 has two clamping limbs 50, 52 which are connected to one another via the contact portion 20. The contact portion 20 and the two clamping limbs 50, 52 are of flat form and the edges 54, 56 between the contact portion 20 and the two clamping limbs 50, 52 are rounded.

The U-shaped damping element 18 clasps the lining backing plate 14 in such a manner that the two clamping limbs 50, 52 of the lining backing plate 14 are arranged on mutually opposite sides of the lining backing plate 14 to fit the recesses 30, 38, 42, 44 symmetrically with respect to the centre plane A (cf. FIGS. 1, 3 and 4). As shown in particular in FIG. 4, the damping element 18 has on each of its two clamping limbs 50, 52 a fixing or locking projection 58, 60. These fixing projections 58, 60 are adapted to lock into the second recess 38 and into the fourth recess 44, i.e. to be in engagement with the second and the fourth recess 38, 44.

The first and the third recess 30, 42 terminates flush with the lateral surface 62 of the lining backing plate 14 (cf. FIG. 4), so that there is no step between the lateral surface 62 of the receiving portion 16 and the respective recess, and the damping element 18 can thus be pushed laterally onto the receiving portion 16 with little effort. In this case, the flat portions of the first and of the third recess 30, 42 are respectively arranged between the first and the second slope 37, 46 and the lateral surface 62.

The fixing projections 58, 60 are produced from the same piece of sheet metal as the rest of the damping element 18 and thus each have the same predetermined material thickness d at all distal ends. As shown in FIG. 4, the length of the second and of the fourth recess 38, 44 along a longitudinal direction of the lining backing plate 14 is respectively greater than the material thickness d. Thus, the spring is held captively on the lining backing plate 14 or the receiving section 16 and at the same time is displaceable or shiftable in the longitudinal direction (parallel to the centre plane A) of the lining backing plate 14.

Moreover, the damping element 18 has, on each of its clamping limbs 50, 52, respectively at least one spring projection 68, 70 angled off with respect to that clamping limb. This can be clearly seen in particular in FIGS. 3 and 4. The spring projections 68, 70 are adapted to slide along the slopes 37, 46 of the first recesses 30, 42. As a result, in particular an impulse supplied to the lining backing plate 14 in the direction F is effectively cushioned. During the cushioning, the two clamping limbs of the damping element are displaced/shifted with respect to the receiving portion. The spring force here is linear. With the aid of material parameters and/or geometrical parameters, it is also possible to set a different dependence between the spring force on the shifting caused, for example an exponential increase in the spring force with the shifting.

As shown in FIGS. 4 and 5, the lateral surface of the lining backing plate 14 is spaced apart from the contact portion 20 of the damping element 18. In the embodiment shown, this spacing is approx. 1 mm. Likewise, the contact portion 20 is spaced apart from the corresponding portion 22 of the brake carrier 24.

Figure 6:
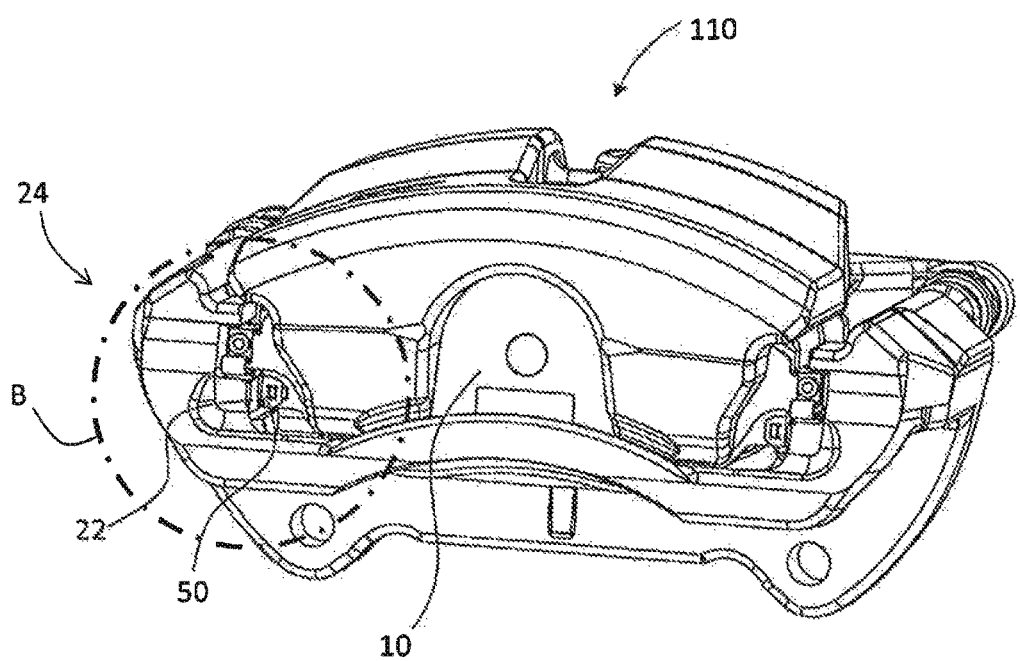
FIG. 6 shows a perspective general view of a disc brake arrangement according to the invention.
Figure 7:
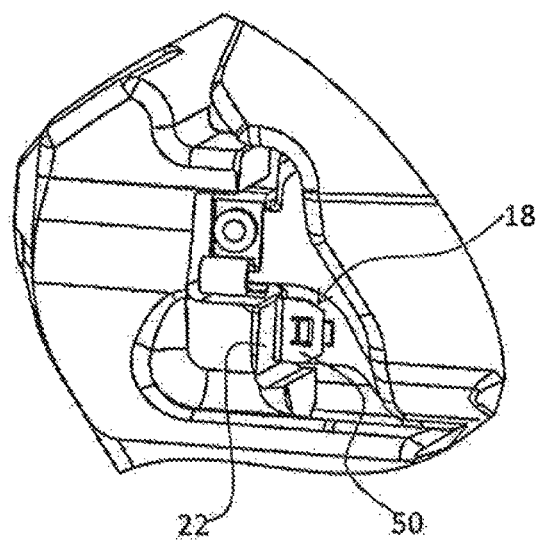
FIG. 7 shows a perspective detail view of the disc brake arrangement from FIG. 6.

In FIGS. 6 and 7 a disc brake arrangement 110 for a vehicle system is shown. In this case, FIG. 6 shows a general view and FIG. 7 shows a detail view of the region B marked in FIG. 6. This disc brake device 110 comprises a brake disc (not shown) and a brake lining arrangement 10 of the type described above, the brake lining arrangement 10 being arranged movably relative to the brake disc, in order to act on the brake disc by means of a friction lining 12. The brake lining arrangement 10 provided therefor has all of the features described above. In particular, in the case of this brake lining arrangement 10, it is provided that the damping element 18 has a contact portion 20 for contacting a portion 22 of a brake carrier 24 corresponding with the contact portion 20 and the damping element 18 is adapted to be deformable or/and displaceable at least in sections upon a contacting.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A brake lining arrangement for a vehicle brake with
  a friction lining and
  a lining backing plate, having a receiving portion arranged in a lateral edge region thereof for receiving a separate damping element, which laterally grasps the lining backing plate,
  the damping element having a contact portion for contacting a portion of a brake carrier corresponding with the contact portion, and the damping element being adapted to be deformable or/and displaceable at least in sections upon a contacting,
  the damping element being of C- or U-shaped configuration and having two clamping limbs which are connected via the contact portion, the damping element clasping the lining backing plate in such a manner that the two clamping limbs are arranged on mutually opposite sides of the lining backing plate,
  wherein the damping element has, on each of the clamping limbs, respectively at least one spring projection angled off with respect to the clamping limb,
  wherein the receiving portion comprises a first recess on a first longitudinal side of the lining backing plate,
  wherein the receiving portion of the lining backing plate further has a second recess which is arranged on the first longitudinal side of the lining backing plate in a manner spaced apart from the first recess, the second recess being arranged at a shorter distance from the centre of the lining backing plate than the first recess.

2. The brake lining arrangement according to claim 1, the first recess having a flat region and/or an edge region, at least in sections sloping with respect to a centre plane of the lining backing plate, with a slope.

3. The brake lining arrangement according to claim 2, wherein the receiving portion of the lining backing plate further has a third and a fourth recess which is arranged on a second longitudinal side of the lining backing plate opposite the first longitudinal side of the lining backing plate, the third recess being formed like the first recess and the fourth recess being formed like the second recess.

4. The brake lining arrangement according to claim 3, wherein the damping element has on each of the two clamping limbs a fixing projection which at a distal end thereof has a predetermined material thickness, the fixing projections being adapted to be in engagement with the second and the fourth recess, the length of the second and the fourth recess along a longitudinal direction of the lining backing plate being respectively greater than the predetermined material thickness of the respective fixing projection.

5. The brake lining arrangement according to claim 3, wherein the spring projections are adapted to slide respectively along a slope in the respectively sloping edge region of the first and of the third recess, in order to cushion an impulse supplied to the lining backing plate.

6. The brake lining arrangement according to claim 1, wherein the damping element is formed materially integrally and has a cutout on each of the clamping limbs in the region of the spring projection.

7. The brake lining arrangement according to claim 1, wherein a lateral surface of the lining backing plate is spaced apart from the contact portion by at least 0.1 mm.

8. A disc brake arrangement for a vehicle system with a brake disc and a brake lining arrangement according to claim 1, the brake lining arrangement being arranged movably relative to the brake disc, in order to act on the brake disc by means of the friction lining.

9. The brake lining arrangement according to claim 1, wherein the at least one spring projection is angled toward a centre plane of the lining backing plate.

10. The brake lining arrangement according to claim 1, wherein the damping element further comprises a fixing projection disposed closer to a distal end of the damping element than the at least one spring projection.

11. A brake lining arrangement for a vehicle brake with a friction lining and
a lining backing plate, having a receiving portion arranged in a lateral edge region thereof for receiving a separate damping element, which laterally grasps the lining backing plate,
wherein the receiving portion comprises a first recess on a first longitudinal side of the lining backing plate, and
wherein the receiving portion of the lining backing plate further has a second recess which is arranged on the first longitudinal side of the lining backing plate in a manner spaced apart from the first recess, the second recess being arranged at a shorter distance from the centre of the lining backing plate than the first recess.

12. A brake lining arrangement for a vehicle brake with a friction lining and
a lining backing plate comprising a receiving portion,
wherein the receiving portion comprises a first recess recessed below a surface of the lining backing plate, the first recess comprising a flat region running substantially parallel to a centre plane of the lining backing plate, followed by a sloping edge region closer to the centre of the lining backing plate than the flat region,
wherein said sloping edge region slopes away from the centre plane, and
wherein the flat region is disposed entirely within the first recess.

13. The brake lining arrangement according to claim 12, wherein the receiving portion of the lining backing plate further has a second recess which is arranged on the first longitudinal side of the lining backing plate in a manner spaced apart from the first recess, the second recess being arranged at a shorter distance from the centre of the lining backing plate than the first recess.

14. The brake lining arrangement according to claim 13, wherein the receiving portion of the lining backing plate further has a third and a fourth recess which is arranged on a second longitudinal side of the lining backing plate opposite the first longitudinal side of the lining backing plate, the third recess being formed like the first recess and the fourth recess being formed like the second recess.

15. The brake lining arrangement according to claim 12, wherein the first recess terminates flush with a lateral surface of the lining backing plate.

\* \* \* \* \*